Jan. 23, 1934.                G. H. SCHAFFNER              1,944,468
                                ANTIGLARE DEVICE
                           Filed Nov. 14, 1930     2 Sheets-Sheet 1

INVENTOR
George H. Schaffner
BY
Swan & Frye
ATTORNEYS

Jan. 23, 1934.  G. H. SCHAFFNER  1,944,468
ANTIGLARE DEVICE
Filed Nov. 14, 1930  2 Sheets-Sheet 2
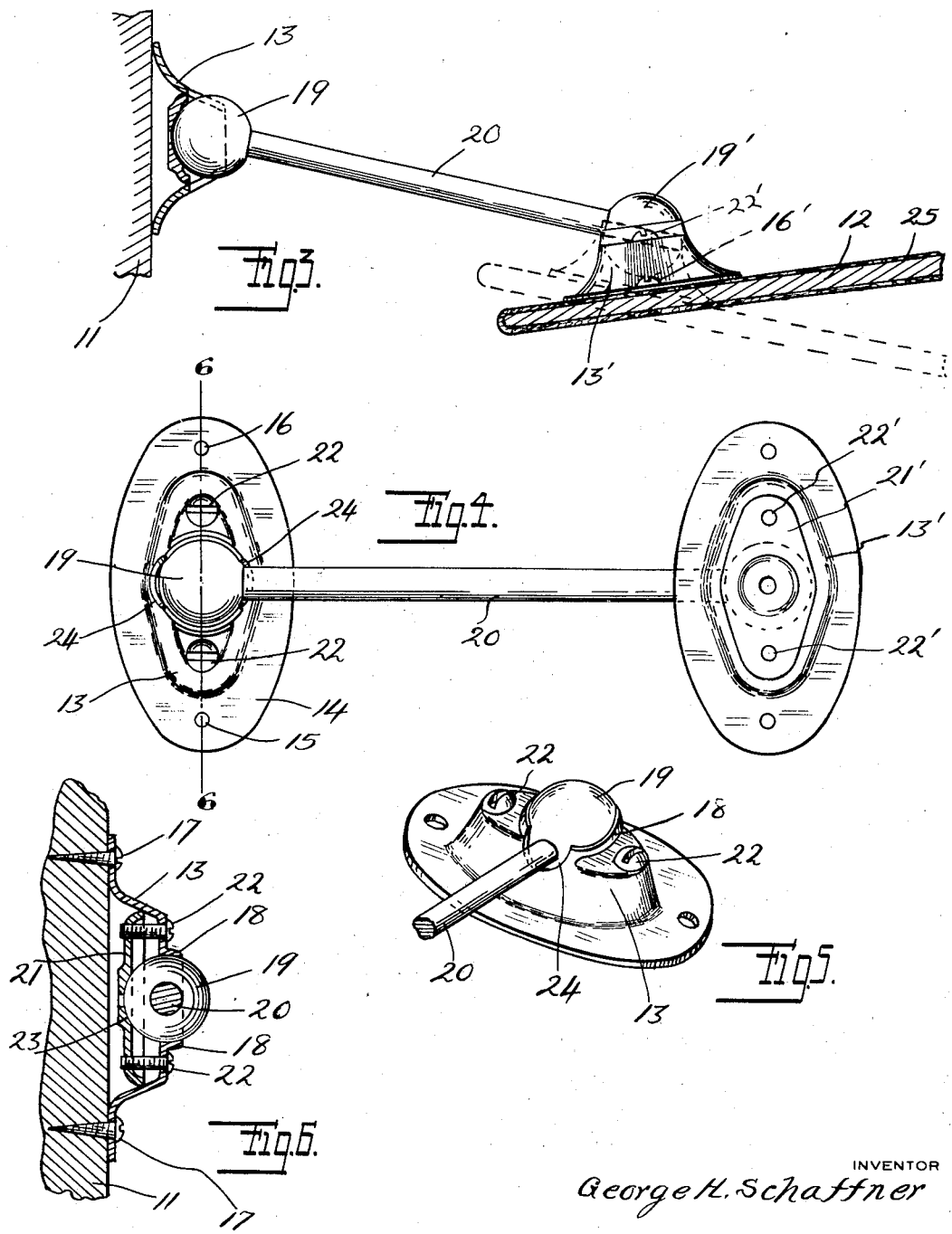
INVENTOR
George H. Schaffner
BY
Swan & Frye
ATTORNEYS Patented Jan. 23, 1934

1,944,468

UNITED STATES PATENT OFFICE 1,944,468

ANTIGLARE DEVICE

George H. Schaffner, Detroit, Mich., assignor to Peerless Novelty Company, Grand Haven, Mich., a corporation of Michigan Application November 14, 1930
Serial No. 495,679

2 Claims. (Cl. 296—97)

This invention relates to anti-glare devices, being more particularly directed to the provision of a novel and effective shield designed to prevent interference with the vision of the driver of a motor vehicle by the sun or approaching bright lights.

An important object of this invention is the provision of such a shield which will be universally adjustable within a desired range, thereby permitting more efficient shielding of the eyes of a driver of a motorcar than has heretofore been possible by means of such a device, and furnishing such protection no matter from what direction the interfering light may be coming.

Another object of my invention is the provision of such a shield which may be so installed upon motorcars as now constructed as to permit shielding the eyes of the driver against annoying light, whether such light be cast toward the driver through the windshield, through a side window, or from any other direction.

Another object of this invention is the provision of such a glare shield which will be simple and inexpensive to manufacture, attractive in appearance, and attachable to a vehicle in a manner in which it offers no interference with free vision or the movements of the occupants when not in use, and a minimum of such interference when in use.

It is further an object of my present invention to provide such a shield which eliminates the necessity for an outside visor above the windshield of a motor vehicle, by performing the function thereof, in addition to others, more effectively, thereby appreciably reducing the wind resistance of the car and enabling greater speed by reason of more efficient streamlining, as well as cutting the cost of manufacture of the automobile as a whole, while increasing the field of vision of the driver and the efficiency of his protection against annoying glare.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a perspective view of my improved eye shield installed in a motor car and adjusted to an operative position, in which it might be used to shield the eyes of a driver against glaring light thrown through the windshield.

Figure 2 is a perspective view taken from the outside and looking down upon a motor vehicle equipped with my device, showing another operative position to which the shield may be adjusted, in which it is used to shield the eyes of a driver against glaring light cast upon him angularly through the side window, or partly through the side window and partly through the windshield, illustrating the wide adaptability and field of adjustment of my device.

Figure 3 is a side view, partly in elevation and partly in section, showing in detail a preferred manner of installing my improved glare shield upon a motor car, the shield plate being only fragmentarily shown.

Figure 4 is a plan view of the adjusting mechanism, also showing the substantial relative proportioning of the parts in my preferred embodiment.

Figure 5 is a perspective view of one of the combined supporting brackets and ball and socket joints which support and render possible adjustment of the glare shield, the supporting rod being fragmentarily shown.

Figure 6 is a sectional view, taken substantially on the line 6—6 of Figure 4, but showing the bracket attached to a supporting panel.

Figure 1:
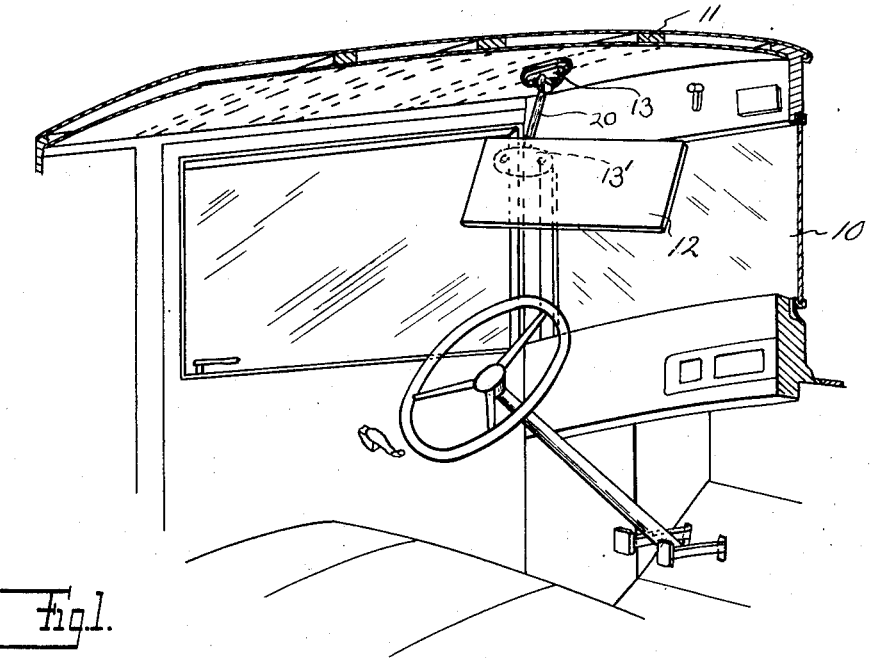

Referring now to the drawings:

Reference character 10 denotes the windshield of a closed motor vehicle, and 11 indicates a reenforcing brace or bow, normally concealed within the roof of closed automobiles as commonly constructed, and running transversely thereof, from one side to the other. I preferably employ the bow 11 as the support for my improved anti-glare shield, although obviously it might be affixed to the car in any other convenient manner. The shield itself comprises the plate 12, which may be of opaque material, although translucent or transparent material may be used if desired, provided it offers sufficient interference to the passage of light to remove glare. My preferred construction is to form the plate 12 of opaque material, such as sheet metal or ply wood, for the reason that transparency or partial transparency of the shield plate is of no appreciable advantage, while if it be formed of a solid material such as metal or wood, it not only possesses much greater strength, but is easier to work, drill, etc., and in addition may more easily be upholstered or covered with cloth to match the upholstery of the car, thus rendering it inconspicuous when folded up against the roof, in a manner which will presently be described.

The glare shield or plate 12 is mounted to be universally movable within a desired range, the means of mounting being such that it will maintain any position to which it may be moved, despite movement or jarring of the vehicle. The structural details of my preferred manner of mounting the plate 12 are clearly brought out in Figures 3, 4, 5 and 6, comprising a bracket 13 carrying a flange 14 which is apertured as at 15 and 16 to form a support for mounting the bracket. The bracket may be affixed to the bow 11 in any suitable fashion, as by the screws 17, which may pass through the relatively thin upholstery covering the bows and forming the visible portion of the interior roof of the car. The bracket is formed to provide a ball and socket joint between itself and the rod 20 which is supported thereby, for which purpose it is centrally apertured, the aperture being formed with upstanding portions 18 which increase the frictional area in engagement with the ball secured on the end of the rod 20, and which is designated 19. Cooperating with the apertured portion of the member 13 is the rear plate 21, which is also formed with a central cooperating depression 23, contoured to receive the ball and to provide a relatively large frictional area in engagement with the ball. The plate 21 is supported by and affixed to the member 13 by means of machine screws, as 22, by the adjustment of which the tension with which the ball 19 is retained between the members 13 and 21 may be regulated, (Figure 6). The upstanding portions 18 of the bracket 13 may be cut away at the sides, as at 24, to increase the range of movement of the rod 20 with respect to the bracket, (Figures 4 and 5). The ball 19 may be formed of solid metal, and the rod 20 secured thereto by being forced into a tightly fitting aperture therethrough. For additional security, the rod may pass all the way through the ball and be peened over at its end.

The rod 20 may be of any length which is found convenient, depending more or less upon the interior dimensions of the vehicle upon which it is to be installed. For ordinary use upon closed pleasure cars, however, I have found the general relative proportions of the parts satisfactory when they compare substantially as do the various parts in Figures 3 and 4.

It will at once be apparent that the ball and socket joint and bracket construction here shown is substantially identical at each end of the rod 20, which I have found to be the most economical method of construction. The various parts have accordingly been numbered in the same way in the drawings, excepting that reference numbers designating the parts of the bracket carried by the free end of the rod 20 carry a prime exponent. The bracket 13', which is of course universally movable with respect to the shaft 20 within the range of the joint, is secured to the shield plate 12, as by bolts 16'. The shield 12 may be covered with cloth, as 25, which may match that of the ceiling of the car, so that when folded up against it the device will present a pleasing appearance and be relatively inconspicuous.

Both socket joints are adjusted to clamp the balls relatively tightly, so that the frictional resistance to movement at the joints is sufficient to maintain the plate 12 in any desired position, even though the vehicle may be jolted or bumped violently. The joints work freely enough, however, to enable the manual movement of the shield plate to any desired position by merely grasping and moving the same, one hand sufficing for this purpose.

Figure 2:
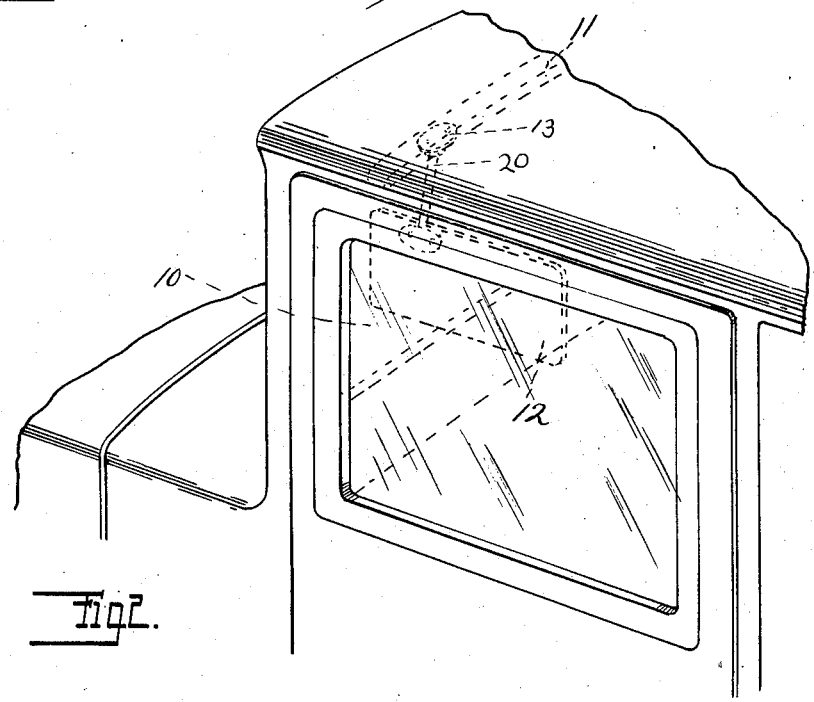

The area through which the device is movable will be seen to be much greater, and the positions in which it may be placed much more varied, than possible with any shield heretofore developed. It may be used to shield the driver against light thrown at him through the windshield from any direction, one common position in which it is thus used being shown in Figure 1. It may also be swung about to shield the eyes of the driver against light coming through the window at his side, as by the sun in early morning or late afternoon, and if desired it may be swung partly out the window to shield his eyes against rays approaching angularly, in which event the window may nevertheless be partly closed if desired, as shown in Figure 2.

It will be apparent that my device fulfills a long felt need, and tends to greatly enhance the pleasure and comfort of the driver of an automobile, as well as increasing his safety and that of other occupants of the vehicle, and that the degree of efficiency of operation of my device is without precedent in the field of eye shields devoted to this purpose.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. A device of the class described comprising, a light shield, a supporting arm, means for attaching said light shield to one end of said arm, a ball at the opposite end of said arm, a mounting plate having a base and a raised portion, said raised portion having an opening therein, a segmental spherical socket portion on the rear surface of said raised portion adapted to receive said ball with said arm extending through said recess, the geometrical center of said segmental recess being outwardly from the plane of the base, a tension member located at the rear side of said plate and engageable with said ball and adjustable means for holding the tension member in engagement with said ball said mounting plate forming a housing and completely surrounding said adjustable means, said housing being of such depth as to conceal the said adjustable means, and also said raised portion having a slot radiating from said opening, said slot being of sufficient width to receive said arm, said mounting plate having openings therethrough for the purpose described.

2. A device of the class described comprising, a light shield, a supporting arm, means for attaching said light shield to one end of said arm, an enlarged portion at the opposite end of said arm, a mounting plate having a base and a raised portion, said raised portion having an opening therein, a socket portion on the rear surface of said raised portion adapted to receive said enlarged portion with said arm extending through said recess, a tension member located at the rear side of said plate and engageable with said enlarged portion and adjustable means for holding the tension member in engagement with said enlarged portion, said mounting plate forming a housing and completely surrounding said adjustable means, said housing being of such depth as to conceal the said adjustable means, and also said raised portion having a slot radiating from said opening, said slot being of sufficient width to receive said arm.

GEORGE H. SCHAFFNER.